Patented June 9, 1936

2,043,941

UNITED STATES PATENT OFFICE 2,043,941

REPELLENT AND/OR FUMIGANT

Evan Clifford Williams, Berkeley, Calif., assignor to Shell Development Company, San Francisco, Calif., a corporation of Delaware No Drawing. Application November 18, 1933, Serial No. 698,592

17 Claims. (Cl. 167—22)

This invention relates to various types of organic sulfur compounds which are suitable as fly repellents, insect repellents, fumigants and the like. They may be employed in sheep dip, for the spraying of fruit trees or for the preservation of wood.

More particularly, the present invention is concerned with the utilization of unsaturated organic sulfides and polysulfides for the objects enumerated supra. Within this group of useful compounds, I have found unsaturated organic sulfides and polysulfides especially valuable which possess the structure

Exemplary members are allyl sulfide, methallyl sulfide and higher homologues and/or substitution products thereof, allyl disulfide, methallyl disulfide and higher homologues and/or substitution products thereof. Asymmetrical as well as symmetrical compounds may be resorted to as well as those unsaturated organic sulfides and disulfides which contain one or more cyclic nuclei as the cinnamyl grouping ($C_6H_5CH=CH-CH_2-$), the styryl methyl carbinol residue

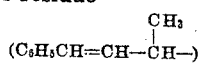

and the like.

The compounds may be used as solutions, suspensions, or as emulsions with kerosene, or other oils, water, alcohols, and other substances. If desired, resort may be had to fixatives, such as heavy petroleum oils, petrolatum, lanolin, waxes or resins, adjuvants, such as pyrethrum extracts, essential oils, etc., so that the material may be poured, smeared, dusted or sprayed on the substances to be protected.

For use as a spray, a liquid mixture may be emulsified by use of any suitable emulsifying agent, such as saponified, sulfonated fish oil or other fatty acid, soluble starch, gelatin, etc. It is desirable, working with animals, to employ a water emulsion with a minimum of oil since an oil film left on an animal's skin tends to raise its body temperature. The water emulsions can be stabilized by the addition of small amounts of the usual dispersing agents, such as "Duponal", sodium oleate, aluminum stearate and the like. Solutions of the repellent in petroleum fractions may be sprayed in confined spaces for combatting flies, gnats, mosquitoes and the like. Fibrous and other materials, such as silk, cotton, burlap, jute, hemp wood, wood pulp, beaver board, straw board and the like, may be treated with the repellent to render such materials immune from attack by rodents, insects and the like.

Especially desirable for plant and animal treatment are those members of the unsaturated organic sulfide and polysulfide class which have sufficiently high boiling points to remain for some time on the plant or animal while still being volatile enough to give off vapor.

For illustrative purposes only, I quote the following report of tests carried out at my request by the Department of Agriculture in the University of California:

Test 1

A stock solution was made by combining

Methallyl disulfide

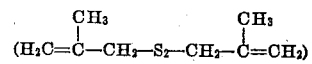

|  |  |
|---|---|
| crude | 45 cc. |
| Petroleum oil (unsulfonatable residue 90%, Saybolt viscosity 97) | 45 cc. |
| Triethanolamine oleate | 8 gm. |
| Distilled water | 35 cc. |

This stock solution was diluted 1 to 8 with water and applied to calves at the rate of 25 cc. diluted mixture per animal. Over an eight hour period, one group showed an average of three flies to the control's 15, and the other group, 5 flies to the control's 20, which is as good as the best sprays heretofore used by the University of California.

Test 2

Two equally attractive pieces of meat were placed on the fly traps with two drops of methallyl disulfide added to one trap, leaving the other normal. The normal trap caught well over 200 flies and the meat was "blown", while the treated meat captured less than 10 flies and there was no "blown" condition.

The unsaturated thio compounds may be prepared by reacting an alkali-metal sulfide or polysulfide with an unsaturated halide in the presence of water at an elevated temperature. For illustrative purposes only, the methods of preparation of methallyl sulfide and of methallyl disulfide are presented:

Example 1

336 gms. of methallyl chloride

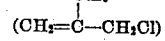

are mixed with 450 gms. of $Na_2S$ and 162 gms. of water. The mixture is heated in an autoclave at 120° C., for two hours. The methallyl sulfide formed is extracted with ether, dried and fractionated, the bulk of the product boiling at 172.8° C. to 173° C.

Example 2

450 gms. of Na₂S, 162 gms. of water and 60 gms. of sulfur are melted to form sodium disulfide. This is added to 336 gms. of methallyl chloride and heated for one hour in an autoclave at 120° C. The reaction is very vigorous. The methallyl disulfide is extracted with ether and the ether removed by distillation.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. As a fly repellent, fumigant and the like, a preparation containing as an active ingredient, a member of the class consisting of unsaturated organic sulfides and polysulfides possessing an olefinic linkage between two carbon atoms in an alkene chain linked to a cyclic nucleus and the sulfur element.

2. As as fly repellent, fumigant and the like, a preparation containing as an active ingredient an unsaturated organic sulfide of the allyl type possessing an alkene chain linked to a cyclic nucleus and the sulfur element.

3. As a fly repellent, fumigant and the like, a preparation containing as an active ingredient an unsaturated organic polysulfide of the allyl type, said active ingredient being present in a concentration effective for the purpose described.

4. As a fly repellent, fumigant and the like, a preparation containing as an active ingredient a symmetrical aralkene sulfide, said active ingredient being present in a concentration effective for the purpose described.

5. As a fly repellent, fumigant and the like, a preparation containing as an active ingredient an alkenyl sulfide possessing an olefinic linkage between two carbon atoms in an alkene chain of at least four carbon atoms linked to the sulfur element, such active ingredient being present in a concentration effective for the purpose described.

6. As a fly repellent, fumigant and the like, a preparation containing as an active ingredient an alkene polysulfide, said active ingredient being present in a concentration effective for the purpose described.

7. As a fly repellent, fumigant and the like, a preparation containing as an active ingredient an olefinic polyalkyl disulfide, said active ingredient being present in a concentration effective for the purpose described.

8. As a fly repellent, fumigant and the like, a preparation containing as an active ingredient methallyl sulfide.

9. As a fly repellent, fumigant and the like, a preparation containing as an active ingredient methallyl disulfide.

10. As a fly repellent, fumigant and the like, a preparation containing as an active ingredient a member of the class consisting of unsaturated organic sulfides and polysulfides which possess an open ethylenic group at least once removed from a sulfur atom and in a hydrocarbon chain of at least four carbon atoms, said active ingredient being present in a concentration effective for the purpose described.

11. As a fly repellent, fumigant and the like, a preparation containing as an active ingredient an asymmetrical unsaturated organic sulfide, said sulfide being unsaturated in an alkene chain.

12. As a fly repellent, fumigant and the like, a preparation containing as an active ingredient an unsaturated organic sulfide containing at least one cyclic grouping, said sulfide being unsaturated in an alkene chain.

13. As a fly repellent, fumigant and the like, a preparation containing as an active ingredient an isoalkenyl sulfide.

14. As a fly repellent, fumigant and the like, a preparation containing as an active ingredient a member of the class consisting of unsaturated organic sulfides and polysulfides possessing an olefinic linkage in an alkene chain, said alkene chain containing at least four carbon atoms.

15. As a fly repellent, fumigant and the like, a preparation containing as an active ingredient a member of the class consisting of unsaturated organic sulfides and polysulfides possessing an unsaturated carbon atom linked to three carbon atoms in an alkyl chain.

16. As a fly repellent, fumigant and the like, a preparation containing as an active ingredient a member of the class consisting of unsaturated organic sulfides and polysulfides possessing an unsaturated carbon atom linked to three carbon atoms in an alkyl chain, said unsaturated carbon atom being once removed from the sulfur element.

17. As a fly repellent, fumigant and the like, a preparation containing as an active ingredient a member of the class consisting of unsaturated organic sulfides and polysulfides possessing an olefinic linkage in an aliphatic chain, said sulfur compounds possessing boiling points above that of corresponding allyl compounds whereby the former remain for some time on the subject being treated while still being volatile enough to give off vapor under conditions of operation.

EVAN CLIFFORD WILLIAMS.